United States Patent
Jantz et al.

(10) Patent No.: US 10,390,477 B2
(45) Date of Patent: Aug. 27, 2019

(54) MOTOR VEHICLE CARRIER FOR A HAND-PUSHED BROADCAST SPREADER

(71) Applicants: Keith Jantz, Prince George (CA); Shawn Aloisio, Prince George (CA)

(72) Inventors: Keith Jantz, Prince George (CA); Shawn Aloisio, Prince George (CA)

( * ) Notice: Subject to any disclaimer, the term of this patent is extended or adjusted under 35 U.S.C. 154(b) by 0 days.

(21) Appl. No.: 15/994,544

(22) Filed: May 31, 2018

(65) Prior Publication Data

US 2019/0082584 A1 Mar. 21, 2019

Related U.S. Application Data

(60) Provisional application No. 62/512,815, filed on May 31, 2017.

(51) Int. Cl.
| | |
|---|---|
| A01C 7/00 | (2006.01) |
| A01C 7/08 | (2006.01) |
| B60P 1/00 | (2006.01) |
| B60D 1/14 | (2006.01) |
| A01C 17/00 | (2006.01) |
| B60D 1/00 | (2006.01) |

(52) U.S. Cl.
CPC ............ *A01C 7/085* (2013.01); *A01C 17/001* (2013.01); *B60D 1/00* (2013.01); *B60D 1/143* (2013.01); *B60P 1/00* (2013.01); *B60D 2001/006* (2013.01)

(58) Field of Classification Search
CPC .......... A01C 7/085; A01C 17/00; B60D 1/00; B60D 1/143; B60D 2001/006; B60P 1/00
USPC ....................................................... 224/519
See application file for complete search history.

(56) References Cited

U.S. PATENT DOCUMENTS

| | | | | | |
|---|---|---|---|---|---|
| 3,979,137 | A | * | 9/1976 | Lipscomb, Jr. ............ | B60P 3/07 280/402 |
| 4,431,205 | A | * | 2/1984 | Speicher ................... | B60R 9/06 280/282 |
| 4,635,835 | A | * | 1/1987 | Cole ......................... | B60R 9/10 224/501 |
| 4,790,713 | A | * | 12/1988 | Miller ...................... | B60P 3/122 224/493 |
| 4,881,864 | A | * | 11/1989 | Amato ...................... | B60R 9/06 414/543 |
| 5,145,308 | A | * | 9/1992 | Vaughn ..................... | B60P 3/125 280/402 |
| 5,435,475 | A | * | 7/1995 | Hudson ..................... | B60R 9/10 224/324 |

(Continued)

*Primary Examiner* — Peter N Helvey
(74) *Attorney, Agent, or Firm* — Adrian D. Battison; Ade & Company Inc.; Ryan W. Dupuis

(57) ABSTRACT

A carrier mountable to a vehicle for carrying a conventional broadcast spreader features a mounting bar for coupling to the vehicle in a mounted condition and a holder arranged at an end of the mounting bar for supporting the spreader. The holder has a first portion which is in fixed relation to the mounting bar and a second portion which is pivotally coupled to the first portion so as to be movable from a storage position to a lowered position where a front end of the second portion is arranged at the ground. The holder includes a first receptacle for receiving a lower portion of the spreader and a pair of channels, one of which is supported on the second portion so as to be movable therewith and another one which is supported in fixed position on the first portion, which collectively form an enclosure for receiving the leg of the spreader in the storage position.

14 Claims, 4 Drawing Sheets

(56) References Cited

U.S. PATENT DOCUMENTS

| | | | | |
|---|---|---|---|---|
| 5,593,260 | A * | 1/1997 | Zimmerman | B60P 3/077 410/20 |
| 5,620,197 | A * | 4/1997 | Howes | B60R 9/06 280/402 |
| 6,036,417 | A * | 3/2000 | Weaver | B60P 3/073 410/2 |
| 7,217,078 | B2 * | 5/2007 | Short | B65F 1/1452 224/282 |
| 8,075,012 | B1 * | 12/2011 | Perez | B60P 3/125 280/402 |
| 9,539,951 | B1 * | 1/2017 | Levi | B60P 3/125 |
| 9,738,230 | B2 * | 8/2017 | Bohmer | B60R 9/10 |
| 2002/0008363 | A1 * | 1/2002 | Chadwick | B60D 1/52 280/504 |
| 2005/0161906 | A1 * | 7/2005 | Thelen | B60D 1/00 280/504 |
| 2007/0024024 | A1 * | 2/2007 | Maynard | B60P 3/077 280/402 |
| 2007/0170218 | A1 * | 7/2007 | Robb | B60R 9/06 224/519 |
| 2007/0221695 | A1 * | 9/2007 | Winkler | B60R 9/065 224/519 |
| 2009/0028679 | A1 * | 1/2009 | Smith | B60P 1/4421 414/462 |

\* cited by examiner

MOTOR VEHICLE CARRIER FOR A HAND-PUSHED BROADCAST SPREADER

This application claims the benefit under 35 U.S.C. 119(e) of U.S. provisional application Ser. No. 62/512,815, May 31, 2017.

FIELD OF THE INVENTION

The present invention relates to a carrier for a broadcast spreader that is mountable to a motor vehicle, for example a pickup truck, thereby allowing the broadcast spreader to be transported with the vehicle but without moving the broadcast spreader from the ground and into the vehicle therefor. Typically, the carrier is adapted for mounting to a hitch receiver attached to the motor vehicle.

BACKGROUND

Companies which provide lawn care services must typically transport with them to a job site a broadcast spreader for spreading fertilizer and other particulate material on a lawn for enhancing same. Broadcast spreaders may be relatively heavy pieces of equipment, and thus it may be cumbersome to load and unload a broadcast spreader from a work vehicle, for example into and out of a bed of a pickup truck.

SUMMARY OF THE INVENTION

According to one aspect of the invention there is provided a carrier mountable to a vehicle for carrying a spreader which comprises a frame, a hopper mounted on the frame for receiving particulate material to be spread, the hopper having an opening at or adjacent its bottom for discharging the particulate material, an axle carried by the frame at or adjacent the bottom of the hopper, wheels rotatably coupled on the axle for rolling engagement with the ground, a spreading device beneath the opening that is operatively coupled to the axle so as to be driven by rotation of the wheels for propelling the particulate material away from the spreader, a leg extending downwardly from the hopper for resting on the ground, and a handle extending upwardly from the hopper for gripping by a user, the carrier comprising:

a mounting bar for coupling to the vehicle in a mounted condition;

the mounting bar extending between a first end and a second end which is arranged to be located beyond the vehicle;

a holder arranged at the second end of the mounting bar for supporting the spreader thereon;

the holder comprising a first portion supported in fixed relation at the second end of the mounting bar and extending away therefrom, the first portion being arranged to be held at a position spaced above the ground in the mounted condition;

the holder comprising a second portion with a rear end which is coupled to the first portion, a front end, and first and second sides spanning therebetween;

the holder including a first receptacle carried on the second portion for receiving a lower portion of the spreader forwardly of the leg;

the holder including a first channel supported on the first portion comprising a top surface extending in a direction from the first side to the second side of the holder and a downwardly depending surface at a rear of the top surface such that the first channel opens towards the front end of the second portion;

the holder including a second channel supported on the second portion comprising a bottom surface extending from the first side to the second side and an upstanding surface at a front of the bottom surface such that the second channel opens towards the rear end of the second portion;

the first and second channels cooperatively forming a second receptacle in a storage position of the holder for receiving the leg of the spreader therein;

and a locking mechanism arranged to maintain the holder in the storage position;

wherein the second portion of the holder is pivotally coupled to the first portion at the rear end of the second portion where there is defined a pivot point which is pivotal about a horizontal axis;

the second portion of the holder thus being pivotally movable between the storage position in which the second portion is arranged spaced above the ground with the second receptacle formed and a lowered position in which the front end of the second portion is arranged at the ground and the first receptacle is below the pivot point such that the handle of the spreader is operable as a lever to lift the second portion with the spreader to the storage position.

The spreader may thus be moved from the ground to a position above ground where the spreader is supported on the carrier in the storage position without manually lifting the spreader in its entirety off the ground. When the spreader is appropriately arranged on the carrier, the spreader may be utilized so as to move the carrier into the storage position. The carrier is relatively simple in design.

In one arrangement the second channel which is movable with the second portion is located below the pivot point in the lowered position.

In one arrangement the first receptacle is arranged to receive the axle and includes upper and lower guide surfaces which diverge from one another in a direction towards the front end.

In one arrangement the upper guide surface is curved.

In one arrangement the lower guide surface is linearly inclined.

In one arrangement the second channel is located forwardly of the pivot point.

In one arrangement the first channel is located forwardly of the pivot point.

The first channel may be mounted in a position cantilevered forwardly from the first portion of the holder.

In one arrangement the first receptacle is held at a height spaced above that portion of the second portion where the first receptacle is located.

It is preferred that the front end of the second portion is arranged to engage the ground in the lowered position. Thus in one arrangement the second portion has a top surface and a bottom surface and the front end is inclined in a forward direction from the bottom surface to the top surface so that the second portion is arranged for resting at an angle to the ground with the front end substantially flat against the ground.

In one arrangement the locking mechanism includes a pin supported on the first portion of the holder so as to be movable longitudinally of the holder for cooperation with an aperture at the rear end of the second portion, the pin being movable from a locked position in which the pin is passing through the aperture to a freed position in which the pin is located outside of the aperture by an actuator arranged to be operable by a foot of the user.

Preferably the holder is arranged at right angles to the mounting bar such that the mounting bar is transverse to the holder.

Typically the mounting bar has at least one pair of apertures at diametrically opposite positions of the mounting bar so as to be arranged to receive therethrough a cooperating pin to secure the mounting bar to the vehicle. In this arrangement the mounting bar is coupled to a hitch receiver on the vehicle.

In one arrangement, the first receptacle comprises a pair of ramp members disposed in transversely spaced condition to one another crosswise to a longitudinal direction of the second portion between the front and rear ends of the second portion, and distal ends of the ramp members define the front end of the second portion.

Preferably, proximal ends of the ramp members are convexly curved rearwardly and upwardly.

Preferably, the ramp members each include an outer peripheral wall defining on its inner face a support surface for engaging the wheels of the spreader in rolling movement and at least one sidewall upstanding from the outer peripheral wall to resist movement of the spreader in a transverse direction of the second portion.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1:
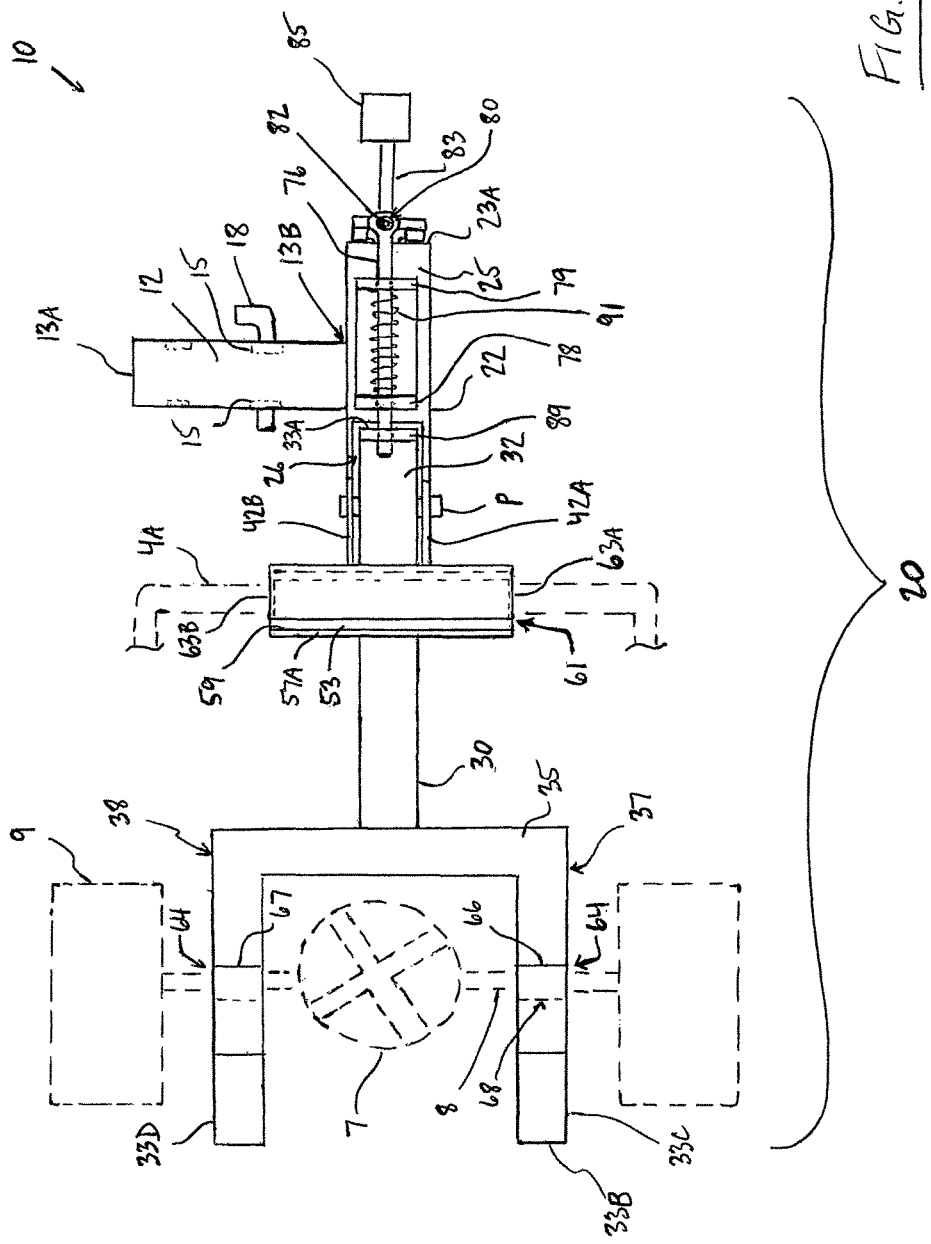
FIG. 1 is a top plan view of a first arrangement of carrier according to the present invention, where the carrier is illustrated in a storage position and a spreader is illustrated using dashed lines but only a bottom portion thereof is shown for clarity of illustration.
Figure 2:
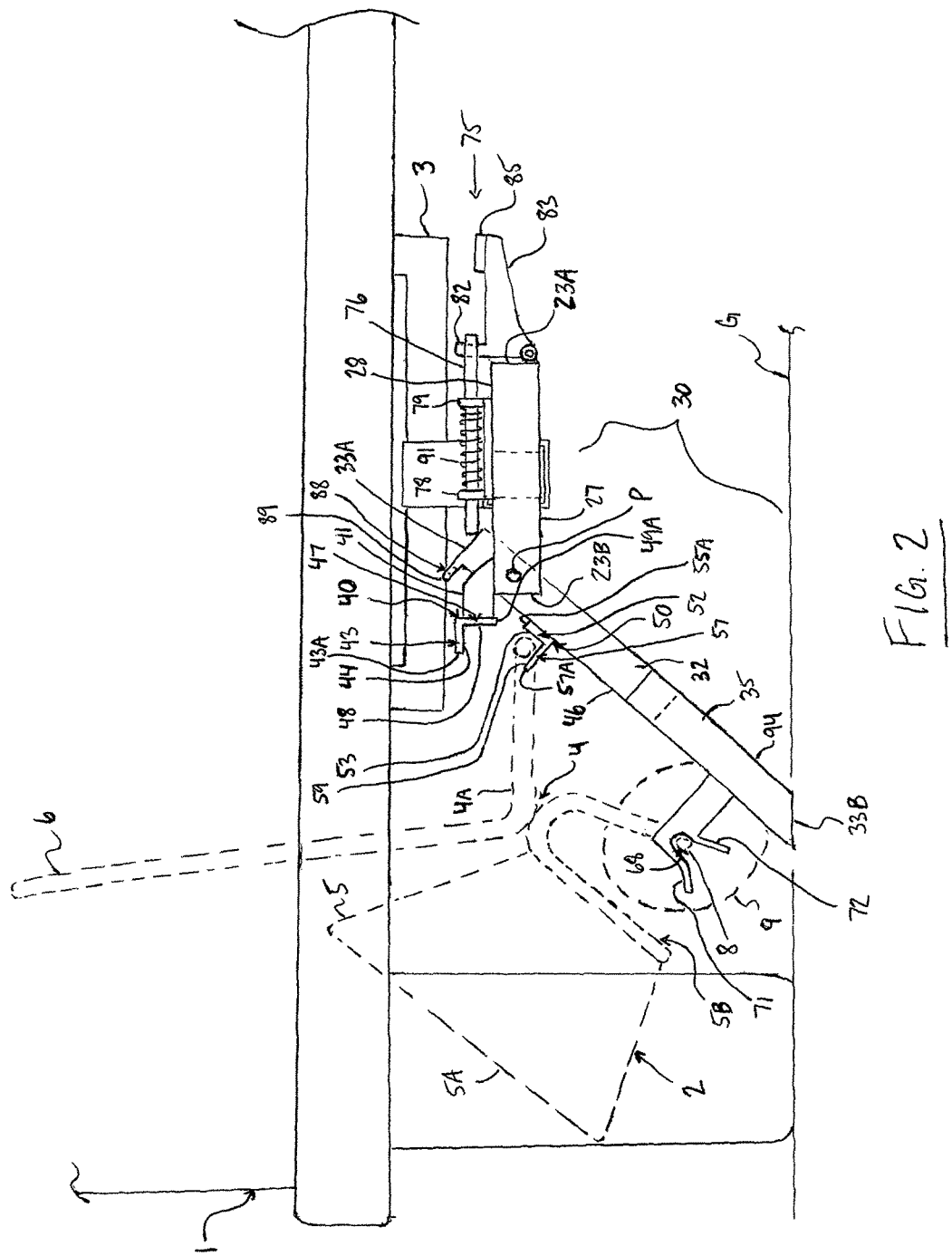
FIG. 2 is an elevational view illustrating the arrangement of FIG. 1 in a lowered position. The carrier is shown as being attached to a vehicle with a hitch receiver. The spreader is shown in dashed lines but only a sectional view thereof is shown for clarity of illustration.

Referring to the accompanying figures, FIGS. 1 and 2 show a carrier, which is generally indicated at reference numeral 10, mountable to a vehicle 1 (schematically shown) for carrying a spreader 2 which is used to distribute particulate material over an area. The carrier 10 is particularly designed for use with a conventional broadcast spreader of the manual push variety. Furthermore, the carrier 10 is particularly suited for mounting via a hitch receiver 3 of the vehicle 1.

The conventional broadcast spreader 2 typically comprises a frame 4 formed from metal tubing arranged to define at a front of the spreader a receptacle for receiving a hopper 5; a handle 6 at a rear of the spreader that extends rearwardly and upwardly from the receptacle for gripping by a user; and a leg 4A below the receptacle so that the spreader can be rested on the ground. The leg 4A may formed from a unitary tube which is bent so as to be generally U-shaped with a central horizontal portion which contacts the ground when the spreader is rested thereupon.

The hopper 5 of the spreader is mounted on the frame 4 at the receptacle for receiving particulate material to be spread, most often fertilizer. The hopper 5 has a peripheral wall which tapers from an open top 5A to an opening 5B at or adjacent its bottom for discharging the particulate material. Beneath the opening in the bottom of the hopper there is a spreading device 7 which is operatively coupled to an axle 8 so that rotation of the axle about its own axis acts to drive the spreading device 7 in a manner propelling the particulate material deposited thereon horizontally outwardly and away from the spreader. Commonly, the spreading device 7 comprises a horizontal disc with a plurality of upstanding fins on the disc at angularly spaced positions thereabout. Furthermore, the axle 8, which is carried by the frame 4 at or adjacent the bottom of the hopper, supports wheels 9 rotatably coupled thereto on either side of the spreading device for rolling engagement with the ground. Rotation of the wheels 9 drives the spreading device to propel the particulate material outwardly and away from the spreader.

The carrier 10 thus generally comprises a mounting bar 12 for coupling to the vehicle 1 in a mounted condition, as illustrated in FIG. 2, and a holder 20 for supporting the spreader thereon that is disposed at that end 13B of the mounting bar which is arranged to be located beyond a periphery of the vehicle 1.

Turning first to the mounting bar, in the illustrated arrangement the mounting bar 12 is formed from metal tubing with square cross-section that is arranged for insertion into the conventional hitch receiver 3, as is common in the art of hitch receivers. The mounting bar extends longitudinally between a first end 13A, at which the bar 12 is inserted into the hitch receiver 3 so as to be located within the periphery of the vehicle 1, and the second end 13B which is arranged to be located beyond the vehicle. The mounting bar 12 includes at least one pair of apertures 15 where the apertures of the pair are located at transversely opposite positions in walls of the mounting bar 12. That is, the apertures 15 are diametrically opposite one another relative to a transverse cross-section of the mounting bar, and as such they are alignable with apertures (not shown) in corresponding locations in the hitch receiver 3 so as to be arranged to receive through the series of aligned apertures a cooperating pin 18 to secure the carrier at its mounting bar to the vehicle.

Turning now to the holder, the holder 20 comprises a first base portion 22 which is arranged at the second end 13B of the mounting bar in fixed relation thereto. The first base portion extends longitudinally of the holder from a base rear end 23A, which is located to one side of the mounting bar and defines a rear end of the holder, to a base forward end 23B which is located on another side of the mounting bar such that the base portion (and, more generally, the holder 20) is oriented perpendicularly transversely to the mounting bar, that is, at right angles thereto.

The first base portion comprises an elongate metal bar 25 which is oriented in a common plane with the mounting bar 12. A cut-out 26 which is rectangular in shape is formed in the metal bar 25 at the forward end 23A of the base portion such that another bar extending longitudinally of the first base portion 22 may be received in the cut-out 26. The cut-out 26 is thus open at the forward end 23A and at a top and bottom of the first base portion 22 such that a member may be passed from a position at or adjacent a bottom surface 27 of the first base portion to a position at or adjacent a top surface 28 of the first base portion.

As such, in the cut-out 26 a second movable portion 30 of the holder is received and is pivotally coupled to the base portion 22 at pivot point P defined by a pin passing perpendicularly transversely of the holder at the cut-out 26. That is, the pivot point P defines a horizontal pivot axis.

The second movable portion 30 comprises a first bar 32 extending longitudinally of the base portion 22 and which is received in the cut-out 26 such that the movable portion 30 is pivotally coupled to the base portion 22 at the first bar 32.

The first bar 32 defines at its free end a rear end 33A of the movable portion which is spaced, relative to the base portion 22, longitudinally rearwardly of the pivot point P and the forward end 23A of the base portion.

Opposite the free end 33A of the first bar there is provided a bifurcated fork 35 which extends transversely outwardly from the first bar 32 to form a pair of prongs 37, 38 which extend forwardly of the first bar to tips defining a front end 33B of the holder. The prongs 37, 38 which are spaced symmetrically to either side of the first bar 32 define at their outer sides first and second sides 33C and 33D of the holder.

A plurality of receptacles are disposed on the holder 20 so as to receive the spreader 2 in a manner securing same to the carrier, as will be described in more detail below.

There is provided a first channel 40 which is supported on the first base portion 22 in a position cantilevered forwardly from the base portion at a location forwardly of the pivot point P. The first channel is connected to the base portion 22 by a neck 41 formed by a pair of upstanding plates 42A and 42B connected to the metal bar 25 on either side of the cut-out 26.

The first channel 40 comprises a top plate 43 extending from a first side edge in a width direction of the holder to a second side edge. The top plate oriented in a horizontal plane which defines at its bottom a top surface 44 of the first channel. The top plate 43 is held spaced above a top surface 46 of the second movable portion 30 at the first bar 32, particularly when the second movable portion 30 is held in a common plane as the bar 25 of the base portion in a storage position of the holder which will be described in more detail later.

At a rear of the top plate 43 there is provided a rear plate 47 depending downwardly from the top plate so as to define at a front of the rear plate a rear surface 48 of the first channel. A bottom free edge 49A of the rear plate is located at or adjacent the top surface 46 of the movable portion at the first bar 32 in the storage position of the holder. The bottom free edge 49A is also located at or adjacent the top surface 28 of the base portion. The first channel 40 thus opens towards the front end 336 of the holder.

It will be appreciated that the rear plate 47 is oriented perpendicularly to the top plate 43 as if the top plate and rear plate were to collectively form an angle iron. Both the rear plate and the top plate are elongated in the width direction of the holder, that is, from the first side 33C to the second side 33D of the holder.

Furthermore, there is provided on the movable portion 30 a second channel 50 which is similar in form to the first channel but opposite in a direction in which the second channel opens. That is, the second channel 50 includes a bottom plate 52 defining at its top a bottom surface 53 of the second channel. The bottom plate 52 is spaced longitudinally forwardly of the pivot point P along the first bar 32 by a distance substantially equal to a spacing of the first channel's rear plate 47 forwardly from the pivot point P along the base portion's bar 25. Thus, a rear free edge 55A of the bottom plate 52 is located at or adjacent the bottom edge 49A of the first channel's rear plate 49A in the storage position and parallel to the top surface 28 of the metal bar 25.

Further to the bottom plate 52, the second channel 50 includes a front plate 57 standing upwardly from the bottom plate at its front and defining at a rear of the front plate an upstanding surface 59 of the second channel. The second channel 50 thus opens towards the rear end 33A of the movable portion.

In the storage position of the holder, which is when the movable portion 30 is held in the common plane with the base portion, the first and second channels 40, 50 cooperatively form a receptacle 61 for receiving the leg of the spreader therein. This receptacle 61 forms a tubular enclosure which is open at its sides 63A and 63B but substantially closed about a horizontal transverse axis so as to contain the central horizontal portion of the spreader leg. In the illustrated arrangement the enclosure has a rectangular, for example square, cross-section. However, in other arrangements the enclosure may have cross-section of different shape produced by channels which have additional surfaces formed intermediate of the top and rear surface 44 and 48 in regards to the first channel 40, and the bottom and upstanding surface 53 and 59 in regards to the second channel 50, such that these additional surface provide a transition from one surface for example the top surface 44 to the other surface for example the rear surface 48.

Further to the receptacle 61 the holder includes another receptacle indicated at 64 which is at or adjacent the front end 33B of the holder for receiving the axle of the spreader.

The axle receptacle 64 is formed by a pair of upstanding bars 66, 67 each of which is at one of the prongs 37, 38. Each upstanding bar 66 and 67 has a cut-out 68 at its top which is open at a front of the upstanding bar and at side faces of the bar so that an element may be passed from a position at or adjacent one side face of the respective bar to a position at or adjacent the other side face thereof. The cut-outs 68 are thus spaced above the top surface 46 of the movable portion 30.

Upper and lower guide surfaces 71, 72 project forwardly from each upstanding bar 66, 67 on either top and bottom of the cut-out 68 so as to guide the axle of the spreader into the pair of cut-outs 68. More specifically, the upper and lower guide surfaces 71, 72 project forwardly and diverge from one another in a direction towards the front end 33B of the holder.

The upper guide surface 71 disposed at the top of the respective cut-out 68 is curved first forwardly from the upstanding bar and then upwardly to a free distal end of the upper guide surface.

The lower guide surface 72 which is disposed at the bottom of the respective cut-out 68 is linearly inclined such that the lower guide surface extends forwardly and downwardly in linear fashion from the respective upstanding bar to a free distal end of the lower guide surface.

The pair of cut-outs 68 which form the axle receptacle 64 are spaced further from the top surface 46 of the movable portion than the second receptacle so as to correspond to a height difference between the axle 8 and the leg of the spreader, as the a bottom of the leg 4A is arranged at a distance below a horizontal plane containing the axle which is substantially equal to a distance of a bottom tangent of the respective wheel 9 from this horizontal plane.

We now turn to a locking mechanism 75 of the holder which is arranged to maintain the holder in the storage position.

The locking mechanism 75 comprises a pin 76 supported on the first base portion 22 of the holder for longitudinal movement relative thereto. That is, the pin 76 is supported in horizontal orientation through an opening in each one of two ears 78, 79 which are longitudinally spaced from one another on the base portion's bar 25.

The pin 76 at its end proximal the rear end 23A of the holder includes an aperture 80 open at a top and bottom of the pin. Through the aperture 80 there is passed an upstanding knob 82 which is coupled in fixed relation to foot lever 83. The foot lever 83 is hinged at the rear end 23A of the first base portion so as to be pivotally movable relative thereto about a horizontal axis. A pad 85 is provided at a distal end of the foot lever which is arranged to be operable by a foot of the user, so that by pressing downwardly on the pad 85 the foot lever acts to move the pin 76 in the rearward direction. The knob 82 remains in position passing through the pin at the aperture 80 when the foot lever is operated so as to move the pin rearwardly as described in this paragraph.

The pin 76 is movable longitudinally of the holder for cooperation with an aperture 88 at the rear end 33A of the second movable portion, which is formed in an upstanding ear 89 at the rear end 33A.

A compression spring 91 is oriented longitudinally of the base portion 22 and is fixed at a forward end to the pin 76 and a rear end to the rear one of the ears 79 so that the spring 91 biases the pin 76 forwardly in a manner such that the pin passes through the aperture 88 of the movable portion 30.

As such, when the foot lever 83, which defines an actuator of the locking mechanism, is operated so as to move the pin 76 to a position with a forward end 76A of the pin located rearwardly of the ear 89, the movable portion 30 is free to pivot about the pivot point P out of the storage position.

The movable portion 30 of the holder, not restrained to the storage position by the locking mechanism 75, is moved into a lowered position as shown in FIG. 2 in which the front end 33B of the holder is arranged at the ground G such that an opening is formed at the leg receptacle 61 so that the leg 4A of the spreader can be received by the holder. The rear end 33A of the movable portion is closed such that when the rear end 33A is swung up as the front end 33B is lowered to the ground G, the closed end 33A may act to stop the pin 76 biased theretowards from inhibiting pivotal movement of the movable portion back to the storage position.

In the lowered position the axle receptacle 64 is disposed below the pivot point P. Also, the second channel 50 is displaced away from the first channel 40 such that a top edge 57A of the front plate 57 is located spaced from a top free edge 43A of the top plate 43 by a distance which is at least equal to a width of the leg 4A at its central horizontal portion. In the illustrated arrangement, the top edge 57A is thus located below the bottom edge 49A of the first channel when the front end 33B is at the ground. As such, the leg 4A of the spreader can be passed by the top edge 57A of the second channel 50, between same and the top free edge 43A of the first channel 40, into a position cradled by the second channel's upstanding surface 59 and bottom surface 53.

With the axle receptacle 64 receiving the axle 8 of the spreader below the pivot point P and below the second channel 50 receiving the spreader's leg, the handle 6 of the spreader may be operated as a lever to lift the movable portion 30 in pivotal movement about the pivot point P back to the storage position.

As the handle 6 is used as a lever, the second channel 50 stops the leg 4A of the spreader against movement towards the front end 33B, and the cut-outs 68 cup the axle 8 which may want to move rearwardly as the spreader's handle 6 is levered generally rearwardly and then downwardly when the handle 6 is located rearwardly of the pivot point P.

The pin 76 is automatically inserted through the aperture 88 as the compression spring 91 biases the pin against the closed rear end 33A of the movable portion until the first bar 35 is lying in the plane of the base portion's bar 25 when biasing of the pin acts to insert the pin through the aperture 88.

In the storage position the leg is enclosed by the receptacle 61 which prevents the spreader from shifting forwardly or rearwardly by the upstanding surface 59 and rear surface 48, or upwardly or downwardly by the top surface 44 and the bottom surface 53 so as to resist movement of the spreader upwardly and downwardly. The axle remains in a positioned seated in the axle receptacle 64.

The holder is operable for movement between the storage position, most clearly illustrated in FIG. 1, and the lowered position, most clearly illustrated in FIG. 2, in the mounted condition of the carrier. That is, in the mounted condition which is most clearly illustrated in FIG. 1 the carrier 10 is secured to the vehicle 1 at the mounting bar 12 so that the first base portion 22 is held spaced above the ground G. As such, in the storage position the movable portion 30, too, is spaced above the ground G and lying in the plane of the base portion 22. In the lowered position, the front end 33B is lowered to the ground at an angle thereto so that the movable portion 30 bridges between the ground G and the base portion 22 held spaced thereabove, It will be appreciated that the front end 33B of the movable portion is inclined such that the end 33B extends forwardly from a bottom surface 94 of the movable portion to the top surface 46 thereof. As such, the front end 33B may be arranged substantially flat against the ground so as to support the movable portion 30 at the angle to the ground.

Figure 3:
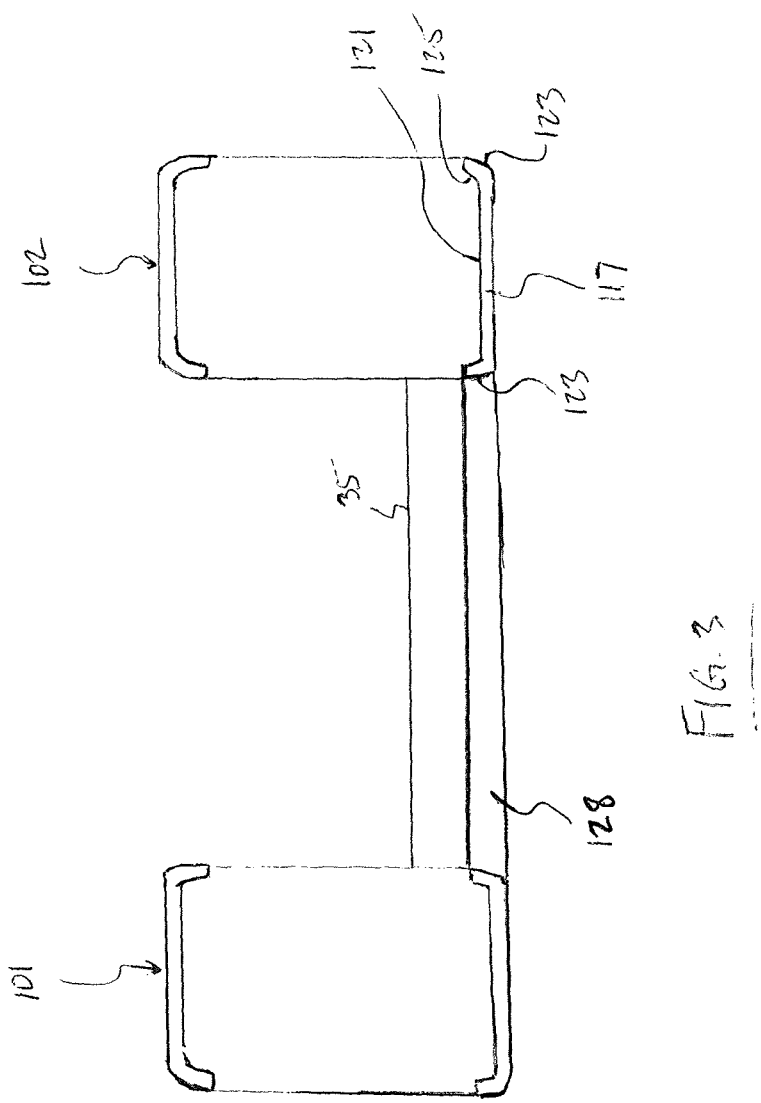
FIG. 3 is a partial end view of a second portion of a second arrangement of carrier according to the present invention showing ramp members thereof.
Figure 4:
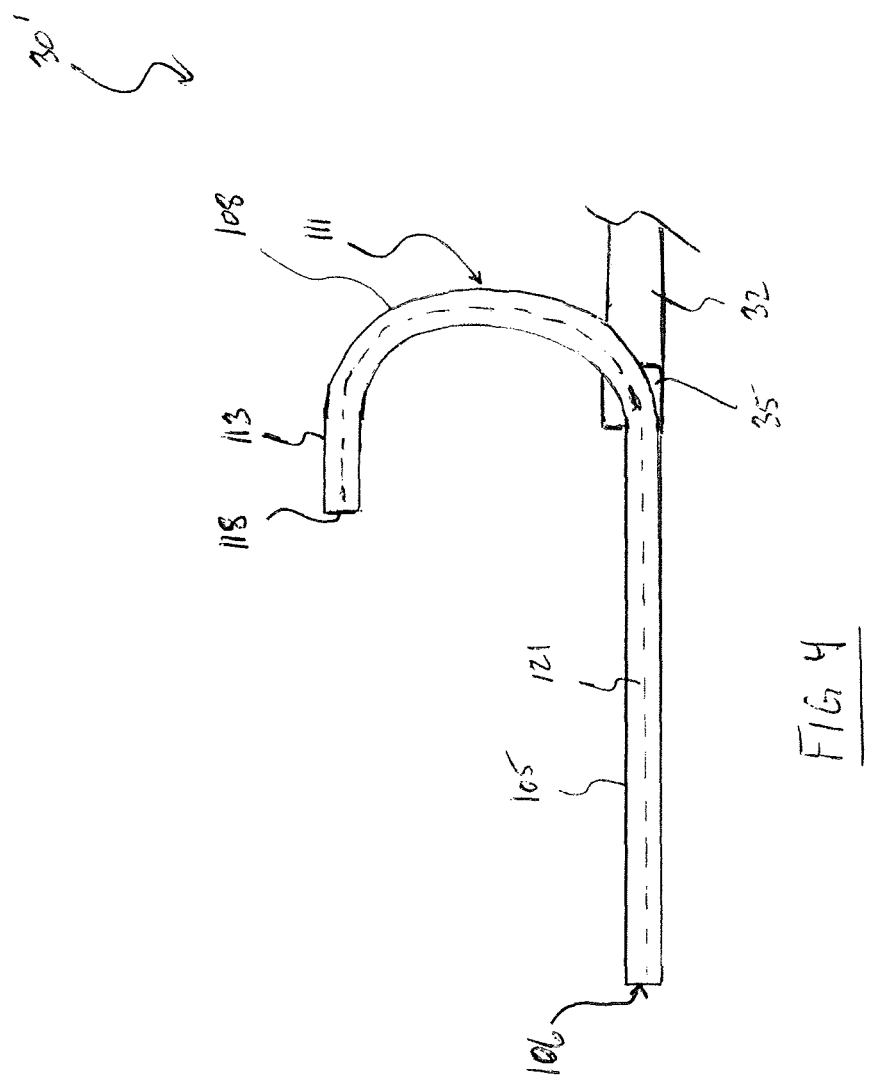
FIG. 4 is a partial side elevational view of the second arrangement as shown in FIG. 3.

In FIGS. 3 and 4 is shown a portion of a second arrangement of carrier which in lieu of the axle receptacle 64 comprises a pair of ramp members 101, 102 which form wheel receptacles for supporting the wheels disposed in transversely spaced condition to one another crosswise to a longitudinal direction of the second movable portion 30' between the front end and rear ends of the movable portion 30'. The ramp members 101, 102 are parallel to one another and symmetrically on either side of the second movable portion 30'. The ramp members 101, 102 comprise a first planar bottom portion 105 which defines a distal end 106 of the respective ramp member. The distal ends 106 of the ramp members 101, 102 define the front end of the second movable portion 30' which defines the front end 33B' of the holder. These ends 106 are in contact with the ground in the lowered loading position of the second portion 30'.

The ramp members 101, 102 each further include a curved proximal portion 108 which is distal and longitudinally opposite to the distal end 106 at the front of the holder. The curved portion 108 at a proximal end 111 of the respective ramp member is convexly arcuately curved rearward and upwardly and curls back on itself such that the respective ramp member 101, 102 is generally J-shaped in side view with a parallel end portion 113 that is parallel to and spaced above the planar bottom portion 105.

The ramp members 101, 102 each comprise a curved outer peripheral wall 117 spanning from the distal end 106 to an upper terminus 118 of the hooked proximal end of the respective ramp member. The outer peripheral wall 117 defines on its inner face a support surface 121 for engaging the wheels of the spreader in rolling movement. Each ramp member 101, 102 also includes at least one sidewall 123 upstanding from the outer peripheral wall 117 to define on its inner face a side surface 125 which is contiguous with the support surface 121. In the illustrated second arrangement there are provided on each ramp member a pair of opposite sidewall 123 which confine each wheel to the respective ramp member 101, 102. Thus, a pair of sidewalls 123 arranged on the ramp members 101, 102 in opposite relation to one another cooperate to resist movement of the spreader in a transverse direction of the second movable portion 30'. The ramp members 101, 102 may be suitably formed from a C-shaped channel which is arcuately curved so as to form a hook that cups and receives a wheel of the spreader in the storage position. The ramp members 101, 102 are rigid in shape.

As shown in FIG. 4 the planar end portion 105 is longer than the parallel upper end portion 113 of the ramp hook so that the lower distal end 106 projects forwardly of the upper terminus 118.

The second arrangement includes a cross-member 128 interconnecting the ramp members 101, 102 near the distal ends 106 thereof.

Thus, generally speaking, the first receptacle of the carrier holder is arranged to receiving a lower portion of the spreader forwardly of the leg, such as the wheels or the axle thereof.

In use of the second arrangement, during loading the spreader is rolled rearwardly along the ramp members until 101, 102 the wheels 9 of the spreader engage the curved end portions 108 which act to surround a rear portion of a circumference of the spreader wheels 9. In this position of the spreader, the spreader leg 4A is received in the second channel, and the second movable portion 30' can be pivoted up to the storage position.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A carrier mountable to a vehicle for carrying a spreader which comprises a frame, a hopper mounted on the frame for receiving particulate material to be spread, the hopper having an opening at or adjacent its bottom for discharging the particulate material, an axle carried by the frame at or adjacent the bottom of the hopper, wheels rotatably coupled on the axle for rolling engagement with the ground, a spreading device beneath the opening that is operatively coupled to the axle so as to be driven by rotation of the wheels for propelling the particulate material away from the spreader, a leg extending downwardly from the hopper for resting on the ground, and a handle extending upwardly from the hopper for gripping by a user, the carrier comprising:

a mounting bar for coupling to the vehicle in a mounted condition;

the mounting bar extending between a first end and a second end which is arranged to be located beyond the vehicle;

a holder arranged at the second end of the mounting bar for supporting the spreader thereon;

the holder comprising a first portion supported in fixed relation at the second end of the mounting bar and extending away therefrom, the first portion being arranged to be held at a position spaced above the ground in the mounted condition;

the holder comprising a second portion with a rear end which is coupled to the first portion, a front end, and first and second sides spanning therebetween;

the holder including a first receptacle carried on the second portion for receiving a lower portion of the spreader forwardly of the leg;

the holder including a first channel supported on the first portion comprising a top surface extending in a direction from the first side to the second side of the holder and a downwardly depending surface at a rear of the top surface such that the first channel opens towards the front end of the second portion;

the holder including a second channel supported on the second portion comprising a bottom surface extending from the first side to the second side and an upstanding surface at a front of the bottom surface such that the second channel opens towards the rear end of the second portion;

the first and second channels cooperatively forming a second receptacle in a storage position of the holder for receiving the leg of the spreader therein;

and a locking mechanism arranged to maintain the holder in the storage position;

wherein the second portion of the holder is pivotally coupled to the first portion at the rear end of the second portion where there is defined a pivot point which is pivotal about a horizontal axis;

the second portion of the holder thus being pivotally movable between the storage position in which the second portion is arranged spaced above the ground with the second receptacle formed and a lowered position in which the front end of the second portion is arranged at the ground and the first receptacle is below the pivot point such that the handle of the spreader is operable as a lever to lift the second portion with the spreader to the storage position.

2. The carrier according to claim 1 wherein the second channel which is movable with the second portion is located below the pivot point in the lowered position.

3. The carrier according to claim 1 wherein the first receptacle is arranged to receive the axle and includes upper and lower guide surfaces which diverge from one another in a direction towards the front end.

4. The carrier according to claim 3 wherein the upper guide surface is curved.

5. The carrier according to claim 3 wherein the lower guide surface is linearly inclined.

6. The carrier according to claim 1 wherein the second channel is located forwardly of the pivot point.

7. The carrier according to claim 1 wherein the first channel is located forwardly of the pivot point.

8. The carrier according to claim 1 wherein the first channel is mounted in a position cantilevered forwardly from the first portion of the holder.

9. The carrier according to claim 1 wherein the front end of the second portion is arranged to engage the ground in the lowered position, and wherein the second portion has a top surface and a bottom surface and the front end is inclined in a forward direction from the bottom surface to the top surface so that the second portion is arranged for resting at an angle to the ground with the front end substantially flat against the ground.

10. The carrier according to claim 1 wherein the locking mechanism includes a pin supported on the first portion of the holder so as to be movable longitudinally of the holder for cooperation with an aperture at the rear end of the second portion, the pin being movable from a locked position in which the pin is passing through the aperture to a freed position in which the pin is located outside of the aperture by an actuator arranged to be operable by a foot of the user.

11. The carrier according to claim 1 wherein the holder is arranged at right angles to the mounting bar such that the mounting bar is transverse to the holder.

12. The carrier according to claim 1 wherein the first receptacle comprises a pair of ramp members disposed in transversely spaced condition to one another crosswise to a longitudinal direction of the second portion between the front and rear ends of the second portion, and distal ends of the ramp members define the front end of the second portion.

13. The carrier according to claim 12 wherein proximal ends of the ramp members are convexly curved rearwardly and upwardly.

14. The carrier according to claim 12 wherein the ramp members each include an outer peripheral wall defining on its inner face a support surface for engaging the wheels of the spreader in rolling movement and at least one sidewall upstanding from the outer peripheral wall to resist movement of the spreader in a transverse direction of the second portion.

* * * * *